Inventor
Myron B. Golber
By: Carl E. Batz
Atty.

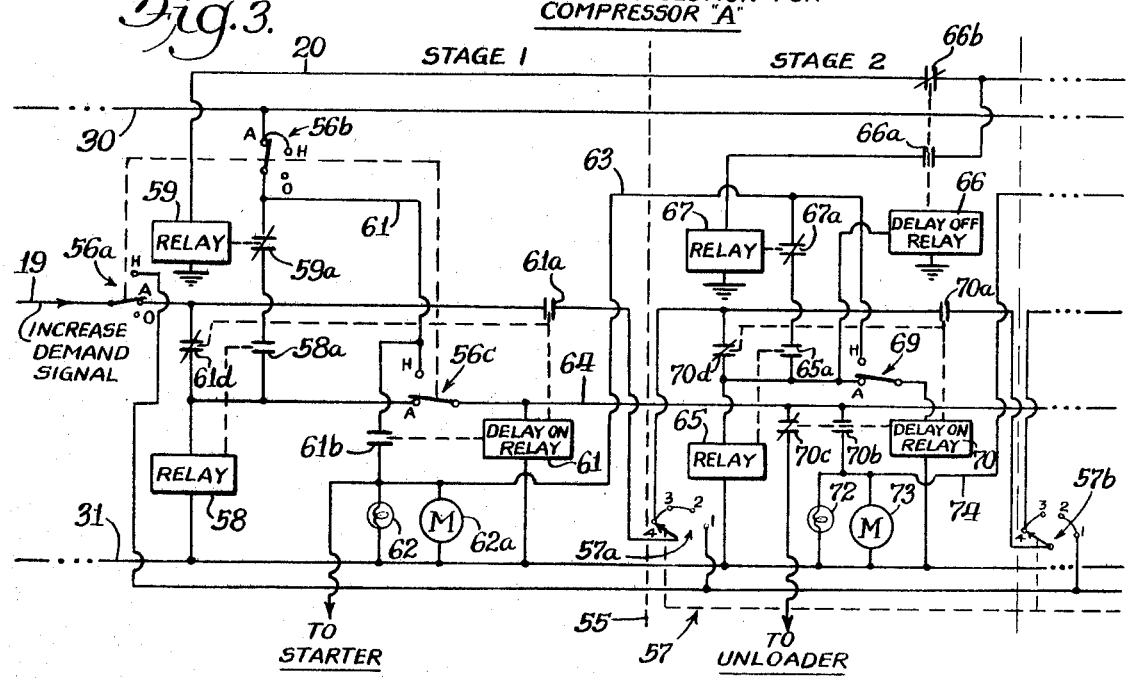
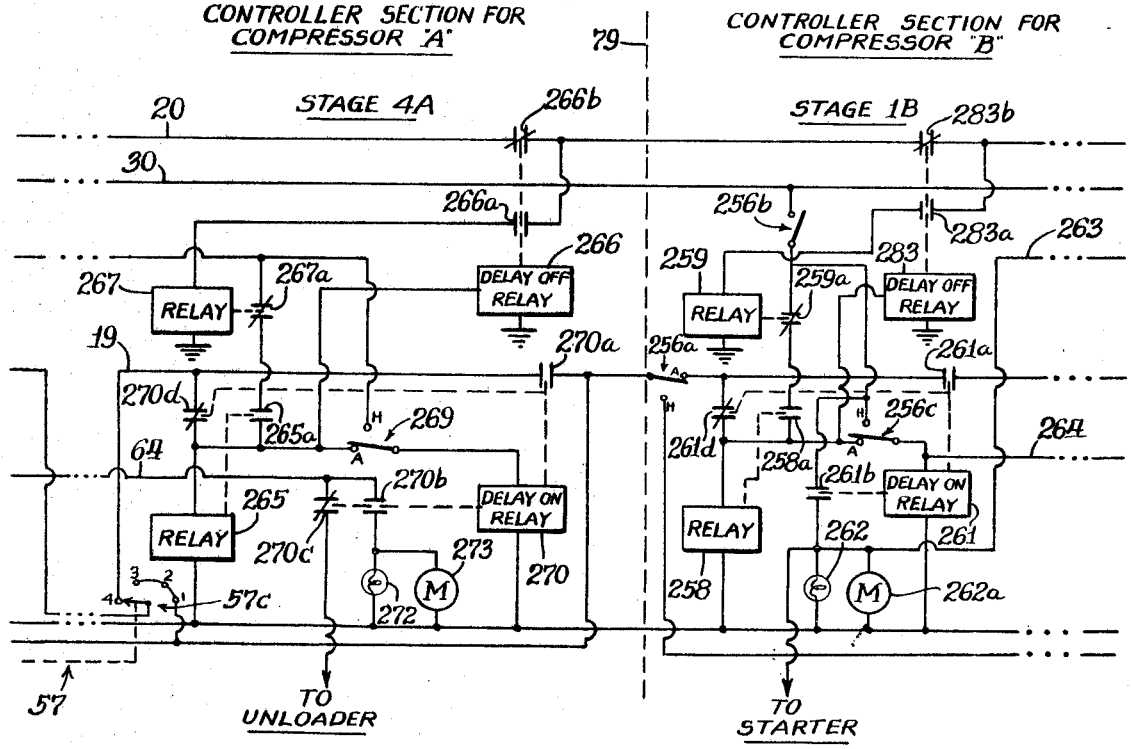

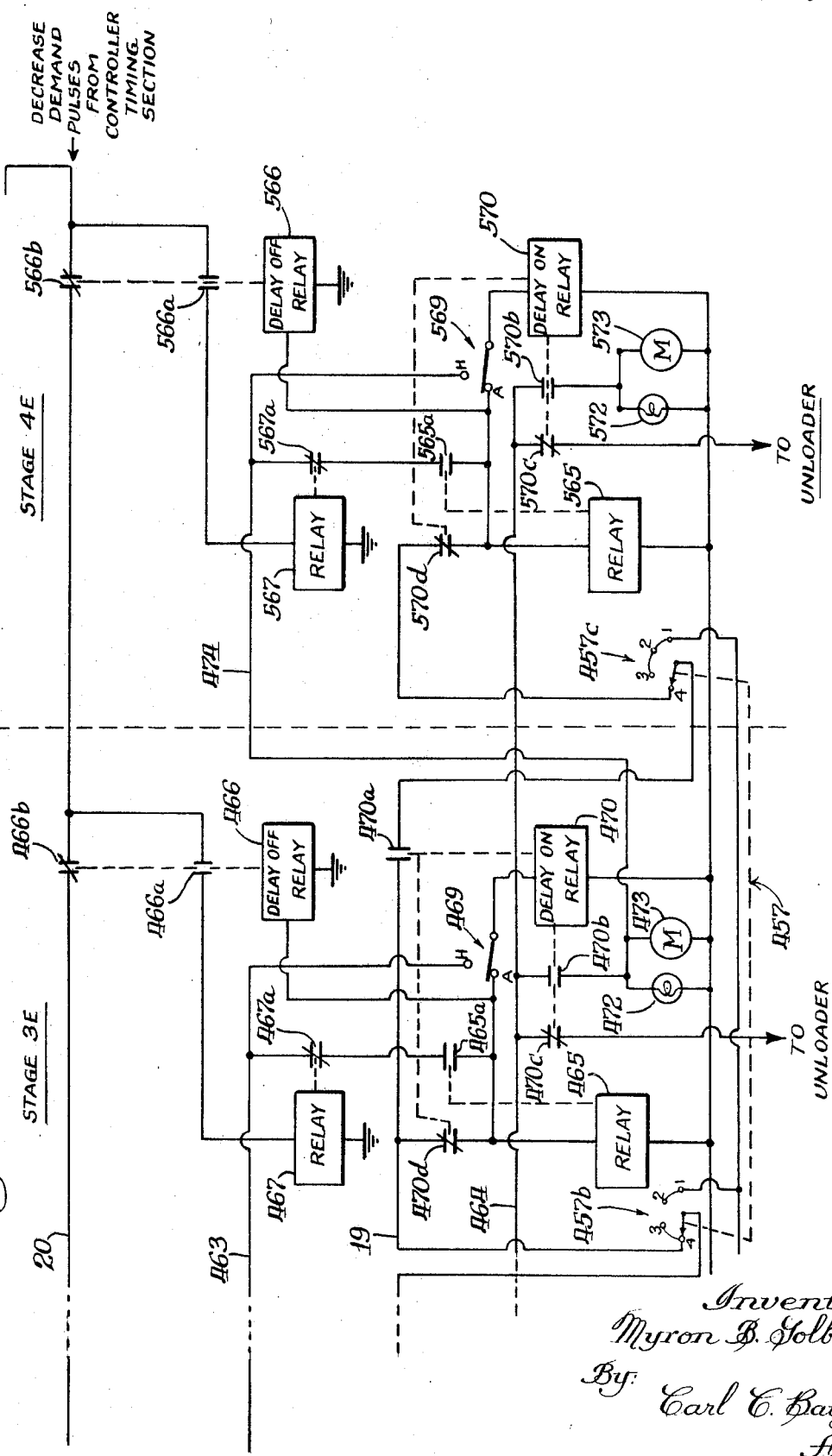

United States Patent Office 3,513,662
Patented May 26, 1970

3,513,662
FEEDBACK CONTROL SYSTEM FOR
SEQUENCING MOTORS
Myron B. Golber, Chicago, Ill., assignor to Armour and
Company, Chicago, Ill., a corporation of Delaware
Filed Nov. 12, 1968, Ser. No. 774,947
Int. Cl. F25b 7/00, 1/00
U.S. Cl. 62—115                                16 Claims

ABSTRACT OF THE DISCLOSURE

A controller provides for sequentially energizing or de-energizing individual stages of a plurality of cascaded control sections according to system demands. A timing section generates a train of increase or decrease demand pulses depending respectively upon whether a preselected control parameter is continuously above or below the control range for a predetermined time. When set to an automatic state, circuitry for individual stages of the controller sections routes the first-occurring increase demand pulse to the first de-energized stage for energizing this stage. Similarly, control circuitry routes a decrease demand pulse to that stage which had been last energized for de-energizing that stage. Individual stages or entire control sections may be removed from the automatic setting to a manual setting so that demand pulses, either increase or decrease, bypass these stages.

BACKGROUND AND SUMMMARY

The present invention relates to a feedback control system; and more particularly, it relates to a feedback control system for automatically sequencing individual compressor stages according to system demands. That is to say, individual stages of a plurality of cascaded compressors are brought into operation or removed from operation as required, to keep the system within a predetermined operating range of one of the system parameters.

In its preferred use, the control system of the present invention is designed to sequence the stages of cascaded ammonia compressors in order to bring the suction pressure of a compressed ammonia refrigeration system back within a predetermined operating range. It will be apparent that the inventive system is also useful in sequencing the operation of other power sources, such as compressors for gases, pumps, heating and cooling elements, electrical generators, etc., which are used to maintain a system parameter, such as temperature, pressure, level, etc., within a desired control range.

Systems are known and in use for sequencing compressor stages; however, commercially-available control systems of this type use cams, pegs, stops, or similar devices fixed in or on a rotatable shaft or drum for engaging fixed switches and thereby opening and closing the switches in a predetermined sequence. Such systems must be completely shut down in the event of a malfunction. Further, servicing problems are considerable; and in systems which use cams, the initial system set-up is difficult and maintenance is often required since the cams are prone to slip after a time due to vibration to which they frequently are subjected and the pressures developed in engaging the fixed switches.

The embodiment of the present invention described herein is designed for use with compressors of the type having one or more individual stages capable of being energized by a common source. Thus, not only are the compressors themselves cascaded, but the stages within each compressor are cascaded so that forward sequencing proceeds from a first stage of a first compressor to succeeding stages of that compressor and thence to the first stage of a succeeding compressor. The control parameter desired to be maintained within a predetermined range is the suction pressure. It will be helpful to distinguish between a compressor (with its sub-elements or "stages") and the controller "sections." One controller section is associated with each compressor and has as many sub-elements (also called "stages") as does its associated compressor.

An increase demand pulse is generated when the suction pressure of the compressor system continuously exceeds the control range for a predetermined time. As long as the suction pressure exceeds the control range, increase demand pulses are periodically generated, and each pulse exists for a fixed time. Conversely, if the suction pressure falls below the control range for a predetermined time, a decrease demand pulse is generated and transmitted to the controller; and a train or periodic sequence of such pulses will be generated until the suction pressure is again within the control range.

The increase demand signals are transmitted from the controller timing section to the first stage of the first controller section, then to subsequent stages of this compressor section as preceding stages are energized, and thence to subsequent controller sections. The decrease demand signals are transmitted along a separate line from the controller timing section to the last stage of the last controller section, then to preceding stages of that section in reverse order as the succeeding stages are de-energized, thence to the last stage of the preceding controller section, and so on until the system is completely de-energized, if such is required.

When an increase demand pulse is received at a stage which had previously been de-energized, the increase demand pulse energizes that stage; and timing mechanism in that stage will, after the increase demand pulse has terminated, establish a signal-gating path to supply power to a succeeding stage and to establish continuity in the increase demand signal line for the subsequent stage while bypassing all stages which have previously been energized. Hence, a subsequent increase demand signal pulse will be fed to a subsequent stage and succeeding stages are cascaded in a similar manner. In the interface between the last stage of one controller section and the first stage of the subsequent controller section, there is no need to feed power to that stage (since power availability is established by operation of a hand switch); however, the increase demand signal line is established for bypassing all previous stages.

A decrease signal pulse is automatically routed to that stage of the cascaded system which had last been energized. When a decrease demand pulse is received in that stage, it de-energizes that stage immediately thereby inhibiting the passage of a subsequent *increase* demand pulse from passage through this stage; and, further, after the termination of the decrease demand pulse, another timing mechanism establishes a bypass in the decrease demand signal line so that subsequent decrease demand pulses will bypass the stage which had just been de-energized and be routed to the preceding stage.

Thus, in the automatic mode operation the individual stages of the compressors are added to or removed from operation as required, and in predetermined order.

The present system does away with the need for the rotation shaft or drum controller of prior systems. This eliminates the critical dependence of system operation on operability of a rotating controller. Further, there are no cams or other mechanical actuators to be set or to slip from setting; and there are no pegs or stops which may break or drop out of place.

A pilot light arrangement identifies the portion of the controller where fault may lie; and the use of plug-in timers and relays permits immediate replacement upon fault detection. Since the controller stages are modular, additional stages or sections having a different number of stages are easily accommodated.

The order in which the compressors are energized is readily changed for balancing wear on the individual compressors; and the timing between energizing adjacent compressor stages is easily set or changed by simply resetting the timing devices. Individual compressors or stages may be manually operated or removed from service without introducing delay in the automatic actuation or de-energizing of adjacent compressors or stages, as the case may be.

The control system does not respond to transitory deviations in the parameter being sensed and controlled (i.e., suction pressure) but will automatically sequence the proper stage only when the parameter has continuously deviated from the desired control range for a predetermined time.

Other features and advantages of the present invention will be apparent to persons skilled in the art from the following detailed description of a preferred embodiment accompanied by the attached drawing, the various figures of which are now to be described briefly.

THE DRAWING

FIGS. 3–5 are circuit schematic diagrams illustrating the interface between adjacent stages of the controller sections.

DETAILED DESCRIPTION

Before proceeding to a detailed description of the individual circuits involved, it is believed that an understanding of the invention will be facilitated by explaining system operation on a functional level. To simplify the explanation, it will be assumed that all compressors are under automatic control by the system. Holding compressors out of service and operation under manual control are explained in greater detail within. The controller of the illustrated embodiment is intended for use with five four-stage ammonia compressors (although any number of stages may be accommodated according to the invention).

Energizing a compressor through a starter powers the motor. The first stage of an energized compressor never unloads; that is, compression starts when the motor starts. However, a short time delay may be incorporated into the system to prevent loading of the motor until it has achieved a desired speed. Each succeeding stage is held unloaded (that is, non-compressing) by means of a solenoid valve unloader which must be de-energized to start compression in that stage.

Figure 1:
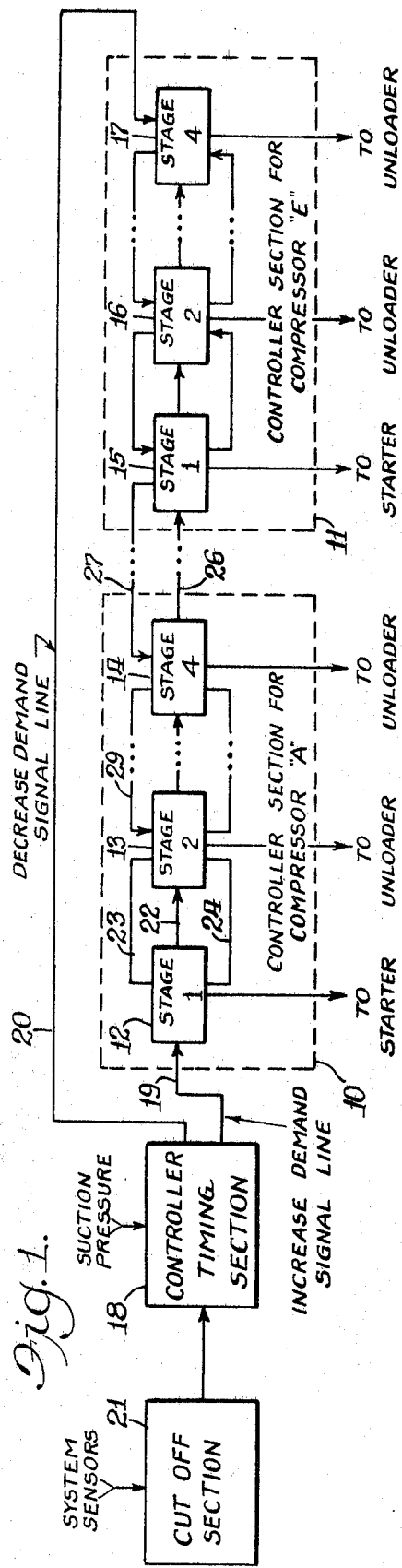
FIG. 1 is a functional block schematic diagram of a control system according to the present invention.

Referring to FIG. 1, the controller sections for individual compressors are enclosed in dashed line; the controller sections for a first compressor, or compressor "A," is enclosed within a dashed line designated by reference numeral 10; and the controller section for the fifth compressor "E" is enclosed within a dashed line 11. It will be appreciated that intermediate controller sections actually are inserted between the two controller sections shown; however, since the interface connections between adjacent controller sections are identical, the controller sections of compressors "B," "C," and "D," are not illustrated.

Controller section 10 includes a separate stage for each of the four stages of compressor "A"; and the stages 1, 2, and 4 are illustrated and denoted respectively 12, 13, and 14. Stage 3 is not illustrated since, again, the interstage connections are the same as those shown for stage 2. Similarly, stage 1, stage 2, and stage 4 for the controller section for compressor "E" are generally designated by reference numerals 15, 16 and 17 within controller section 11.

A controller timing section is designated 18, and it is responsive to the suction pressure of the system. When the suction pressure continuously exceeds a desired control range for a predetermined time, the controller timing section 18 generates a pulse along an increase demand signal line 19 which feeds into stage 1 of controller section 10. The increase demand pulses last for a predetermined time, and a periodic train of such pulses (each pulse energizing a subsequent controller section) will be generated until the suction pressure is back within the control range. Similarly, if the suction pressure falls below the control range for a predetermined time, the controller timing section 18 generates a decrease demand pulse along a decrease demand signal line 20 which feeds into the last stage of the final controller section, which in this case is stage 4 of controller section 11. As in the case of the increase demand pulses, a periodic train of decrease demand signal pulses will be generated until the suction pressure is back within the control range. Various safety features are provided, as explained in greater detail within, in a cut-off section, schematically illustrated at 21 which receives information from various system sensors and de-energizes the controller timing section 18 under certain alarm conditions.

Focusing now on the interconnections between stage 1 and stage 2 of controller section 10, an output line 22 serves as a continuation of the increase demand signal line 19. However, until the stage 1 subsection has been energized, the increase demand pulses are inhibited from transmission to stage 2 along the line 22. Similarly, a line 23 couples decrease demand signal information from stage 2 to stage 1; and the line 23 forms a direct extension of the decrease demand signal line 20 when stage 2 is in a de-energized state (that is, when there is no load on the second stage of its associated compressor). A third interconnection, represented by the line 24 feeds power from stage 1 to stage 2 a predetermined time after stage 1 of the compressor has been loaded.

The inter-stage connections are the same for all subsequent stages except that there are only two interconnections between the last stage of one controller section and the first stage of the succeeding controller section. Thus, the output of stage 4 of controller section 10 includes a line 26 along which increase demand pulses will be fed to subsequent controller sections when all four stages of controller section 10 are energized. Stage 4 of controller section 10 receives a line 27 along which decrease demand pulses will be transmitted to preceding controller sections when the system calls for a decrease in output and all succeeding stages have been de-energized.

For purposes of illustrating the system, let it be assumed that stage 1 of control section 10 is energized, that stage 2 of controller section 10 is not energized, and that the suction pressure is above control range. After the suction pressure remains above the control range for a predetermined time (in order advantageously to eliminate triggering of the system by a transient condition), the controller timing section 18 generates an increase demand pulse along the line 19. This pulse is fed through stage 1 since it is energized and transmitted to stage 2 through line 22 where it energizes stage 2 (which receives its supply power along the line 24). Timing means in the stage 2 controller subsection de-energizes the solenoid-controlled valve associated with its unloader for loading the second stage of compressor "A," and also connects an output line which serves as an extension of the increase demand signal line 19 and is fed to stage 3 of controller section 10. As long as the controller timing section 18 continues to generate increase demand pulses, additional compressor stages will be energized in predetermined order and at predetermined intervals until they are all turned on.

Referring to the same two stages of the first controller section, and assuming that stages 1 and 2 only are energized and that the suction pressure has been continuously below control range for a predetermined time, the controller timing section 18 will then generate a decrease demand pulse along the signal line 20. Since all stages of the controller sections subsequent to stage 2 of controller section 10 are de-energized, when stage 2 receives a decrease demand signal through stage 3 along line 29, stage 2 will be de-energized and continuity of the increase demand signal line between stage 2 and stage 3 will be broken. Further, power will not be supplied to stage 3, and continuity will be established between the decrease demand signal 20 and output line 23 of stage 2. If the next pulse is a decrease demand pulse, it will be transmitted to stage 1; and if the next pulse is an increase demand pulse, it will energize stage 2.

Thus, the present system provides for cascading any number of controller sections and for cascading any number of stages within a given controller section. In the automatic mode, continuity along the increase demand signal line is incrementally established according to the system demand so that the increase demand signal bypasses all energized stages. Similarly, continuity along the decrease demand signal line is incrementally established according to the system demands so that the decrease demand signal bypasses all de-energized stages.

As will be discussed in greater detail within, when the first stage of a controller section is energized, it automatically generates the signal to energize the unloaders associated with the subsequent stages of that controller section; and when these stages are individually energized, they interrupt the signal to their associated unloaders. For simplicity, these interstage lines have not been illustrated in FIG. 1.

Three types of relays are used in the network now to be described. The first is a standard relay in which the contacts associated with the relay react (or "transfer") immediately upon energization or de-energization of the relay coil. A second type of relay, herein called a delay-on relay, has its associated contacts (whether they are normally-open or normally-closed) actuated a predetermined and settable time after the relay coil is *energized* as long as it remains energized, but they transfer immediately when the coil is de-energized. A third type of relay, herein referred to as a delay-off relay, has its contacts actuated immediately upon energization; however, the de-actuation of the contacts is delayed for a predetermined and settable time after the relay has been *de-energized* as long as it remains de-energized.

In referring to the various contacts in the drawing, a convention will be made that a set of contacts will be identified by the reference numeral identifying its associated relay followed by a letter distinguishing the individual sets of contacts.

CUT-OFF SECTION

Figure 2:
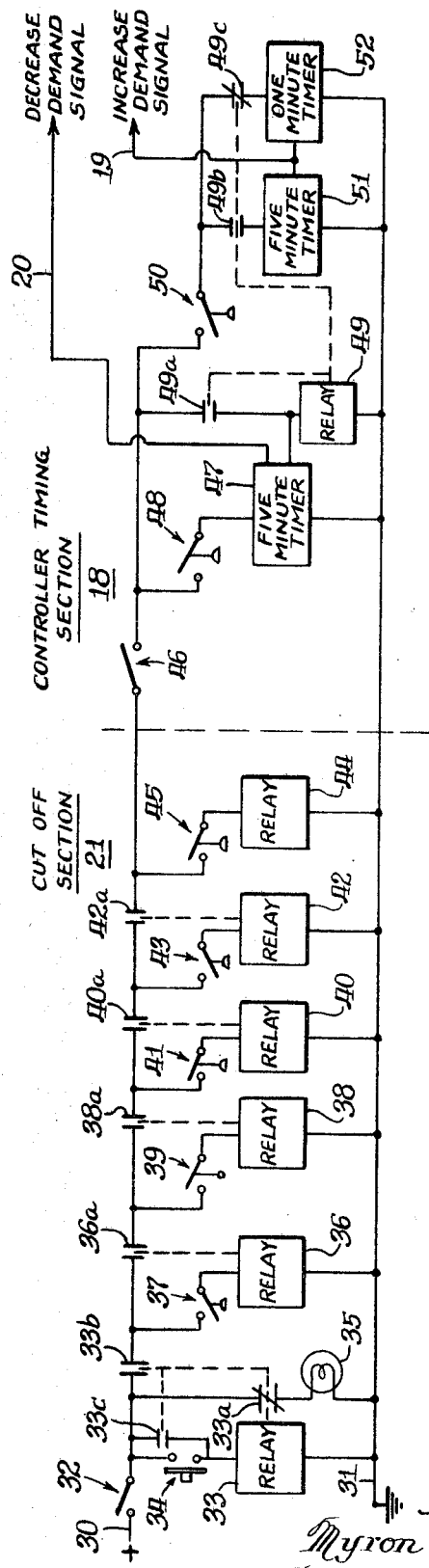
FIG. 2 is a more detailed schematic, partially in functional block diagram form, illustrating the cut-off section and timing section of the controller of FIG. 1.

Turning now to FIG. 2, power is supplied to a "hot" line (i.e. at some portential other than ground) designated 30 and a common line 31, which may be grounded as illustrated. For simplicity in the ensuing discussion, it is to be understood that one terminal of each active element in the controller (for example, timers, relays, solenoids and signal lamps) remains connected to the common line 31, and that such device is energized or de-energized by connecting it to or disconnecting it from the "hot" line 30.

A first switch 32 controls the application of power from the line 30 to the cut-off section 21. A relay 33 is connected in series with a momentary-contact push button switch 34, generally designated 34, across the power lines 30 and 31. Normally-closed (NC) contacts 33a of the relay 33 are connected in series with a lamp 35 across the power lines, normally-open (NO) contacts 33b are connected in series with the line 30, and normally-open contacts 33c are connected across the switch 34 for holding relay 33 energized after the switch is released.

The relay 33 is a power-interruption safety cut-off device which requires manual operation of switch 34 in order to re-establish power to subsequent controller circuitry when power is being restored after supply failure. When power occurs, the relay 33 is de-energized thereby opening contacts 33b and 33c and removing input power to the controller. At the same time, the contacts 33a close to light the signal lamp 35 to isolate the fault when power is restored. Only upon depression of the switch 34 will power be restored to the rest of the controller circuitry. If any compressors had been on manual operation, the operator is warned by lamp 35 that he should clear the system by returning an appropriate number of compressors to an off position or to automatic operation to prevent excess power in-rush on system startup. If all compressors are already either off or set for automatic operation, no change is necessary. After reducing the load to a permissable level for startup, the power interruption safety cut-off is closed by momentary contact of the switch button 34, after which compressors may then be set or returned to manual operation, as explained within.

Four other master cut-offs are provided to prevent unsafe compressor system operation whether on manual or automatic operation. If one of these safety devices interrupts system operation, and there are any compressors on manual operation, these should be placed on automatic or off to avoid excessive power inrush on system restart.

The second of these safety cut-offs includes a relay 36 connected across the power line in series with a pressure switch 37 which closes above a predetermined pressure. The switch 37 is associated with water or other coolant in the compressor jacket, and it comprises a low pressure cut-off safety. When the jacket water supply pressure is above a predetermined minimum level, the switch 37 is closed and normally open contacts 36a associated with relay 36 are also closed thereby maintaining continuity in the power supply line 30.

It will be appreciated that each of these power cut-offs also has associated with it an indicator light (similar to the light 35) and normally-closed contacts 33a for energizing this light and isolating the fault. However, since they are not essential to the understanding of the present invention, they have not been illustrated in the drawing.

A third safety cut-off comprises a relay 38 having NO (i.e., normally open) contacts 38a in series with the power line 30; and the relay 38 is connected across the power lines in series with a float switch 39 which opens above a predetermined level. The float switch 39 is associated with the accumulator; and it de-energizes the controller when level in the accumulator exceeds a predetermined value.

A fourth safety cut-off includes a relay 40 having its coil connected in series with a pressure switch 41 (which opens when the pressure is above a predetermined level) between the power lines. Normally-open contacts 40a of relay 40 are interposed in the power line 30. The pressure switch 41 is associated with condenser high pressure; and it removes power from the controller when condenser pressure exceeds a predetermined level.

A fifth safety cut-off includes a relay 42 having NO contacts 42a interposed in the power line 30. The relay 42 is connected in series with a pressure switch 43 which opens when the pressure falls below a predetermined level. The pressure switch 43 is associated with a suction pressure sensor, and it removes power from the controller when the suction pressure falls below a predetermined level, which level is substantially below the lower level of the control range.

A final safety operating device includes a relay 44 in series with a pressure switch 45 which opens when the pressure exceeds a predetermined level. The pressure switch 45 senses high suction pressure so that an alarm is signaled when the suction pressure exceeds a predetermined level which is substantially above the upper level of the control range.

It will be appreciated that the order in which these safety cut-offs and safety operating devices have been represented in FIG. 2 has been purely arbitrary, and that the effects obtained from these devices may be altered by revision of the order in which they are assembled. For example, relay 33 and its associated contacts, and push button 34 and lamp 35 may, in an alternate arrangement, be presented so as to function between the cut-off section involving relay 21 and controller timing section 18; further, the cut-off section involving relay 36 may immediately follow switch 32.

In addition, each power cut-off may have associated with it an indicator lamp (similar to lamp 35) and normally-closed contacts (similar to contacts 33a) for assisting the operator in locating a fault. The circuitry associated with such indicator lamps may be such that in the event of two or more simultaneous faults only that lamp is lighted which is on the faulty cut-off section closest to switch 32, or so that an indicator lamp will be lighted for each faulty cut-off section. Finally, alarms other than of the visual type such as the described lamps may be signaled in addition to or in place of the above-mentioned indicator lamps.

CONTROLLER TIMING SECTION

Assuming that each of the safety cut-offs is operating under normal conditions, power is then supplied from the cut-off section 21 to the controller timing section 18, the function of which is to generate the increase demand pulses and decrease demand pulses. A master switch 46 is included in the line 30 for energizing the controller timing section 18. A series circuit including a five-minute timer 47 and a pressure switch 48 sensing suction pressure is connected across the power lines in the timing section 18. The timer 47 generates pulses at a fixed period when it is engaged, and the particular period selected is not critical to the operation of the system. The pressure switch 48 is designed to be closed below a predetermined suction pressure level defining the lower level of the operating range.

When the suction pressure falls below the operating range, switch 48 closes thereby energizing the five-minute timer 47. As long as it remains energized, the timer 47 generates an output pulse having a duration of 4.5 seconds which pulse terminates at the end of every five-minute interval. The timer 47 will reset if power is removed from it before the five-minute interval. Thus, the suction pressure must remain beneath the control range for the entire interval of this timer prior to generating the first decrease demand pulse. Further, as long as the suction pressure does remain beneath the control range, the timer 47 will continue to generate decrease demand pulses in a periodic train and transmit them along the decrease demand signal line 20. A separate and isolated output of the five-minute timer 47 (for example, contacts controlled by a clutch which drives a timing motor may be closed upon engagement of the clutch) is coupled to a relay 49; and a set of NO contacts 49a are connected between the line 30 and the relay 49 for holding it energized once it has been initially energized.

Also connected to the line 30 is a pressure switch 50 which senses suction pressure. The switch 50 closes when the suction pressure exceeds a predetermined limit defining the upper limit of the control range. A second five-minute timer 51 (again, the period of five minutes is arbitrary) is connected in series with a set of NO contacts 49b to the switch 50; and a one-minute timer 52 (time period again is arbitrary) is connected through a set of NC contacts 49c to the switch 50. The output signals of the five-minute timer 51 and the one-minute timer 52 are coupled in parallel and connected to the increase demand signal line 19.

Assuming a startup condition wherein suction pressure is above the control range, the relay 49 will be de-energized and the switch 50 will be closed thereby energizing the one-minute timer 52 through the NC contacts 49c. The timer 52 is similar to the previously-described timer 47 except that the 4.5 second pulses terminate at the end of every one-minute interval. Thus, increase demand pulses are generated on a one-minute time base and transmitted to the controller to energize succeeding compressor stages at one-minute intervals.

After the compressors have assumed the load, the suction pressure will drop within control range to open switch 50; and it will normally fall below the control range to close switch 48. This will energize relay 49. Relay 49 will then lock itself in an energized state through contacts 49a. The one-minute timer 52 is removed from operation by the opening of contacts 49c; and the five-minute timer 51 is substituted for it by closing the contacts 49b. Thus, on startup and until the timer 47 is energized for the first time, the period for a train of increased demand signal pulses is one minute; and after a first decrease demand signal pulse is generated, the period for a train of increase demand signal pulses is five minutes. The five-minute timer 51 is similar to the previously-described five-minute timer 47.

CONTROLLER SECTIONS

Turning now to FIGS. 3–5, the circuits for the various controller stages will be described. In FIG. 3, there is shown stage 1 (designated 12 in FIG. 1) and stage 2 (designated 13 in FIG. 1) of the controller section 10 for compressor "A." A vertical dashed line 55 separates the two stages.

Feeding into stage 1 are the power lines 30 and 31, and the increase demand signal line 19. A manual switch having three separate sets of contacts 56a, 56b and 56c determines whether this stage will operate in an automatic mode or manual mode of operation. Each of the individual contacts 56a, 56b and 56c have a contact for automatic operation (denoted "A") and a contact for manual operation (denoted "H"). The automatic terminal "A" of contacts 56a receives the increase demand signal line 19. Contacts 56b couple power from the "hot" line 30 to the stage-1 circuitry. As will be made clear from subsequent discussion, the power line 30 is coupled by means similar to contacts 56b to each of the first stages of each controller section; and power is thence supplied to succeeding stages within that section in cascade fashion and only after the previous stage has been energized by an increase demand pulse. It will further be observed that the decrease demand signal line 20 and increase demand signal line 19 do not carry a steady signal—that is, they may be considered to be at ground level or at a floating potential except when energized by a demand pulse.

A first relay 58 having NO contacts 58a is connected between the common line 31 and the "A" contact of contact set 56a and increase demand signal line 19 in series with a set of NC contact 61d which are discussed below. A second relay 59 is coupled to the decrease demand signal line 20 and has NC contacts 59a. The NC contacts 59a and NO contacts 58a are connected in series between the switch 56b and the junction between the relay 58 and the NC contacts 61d.

A line 61 is connected between the wiper blade of switch 56b and the "H" position of switch 56c. The "A" contact of switch 56c is directly connected to the common junction of the relay contacts 58a and 61d. The blade of the switch 56c is connected to a Delay On relay 61, the other terminal of which is connected to the common line 31. The Delay On relay 61 has a first set of NO contacts 61a which, when actuated, establish continuity between the input and output terminals of stage 1 for the increase demand signal line 19. Relay 61 has a set of NO contacts 61b which are interposed between the fixed position "H" of the switch 56c and the starter of stage 1. A lamp 62 and an elapsed time meter 62a are each connected between the contacts 61b and the common line 31 to be energized when the starter is energized. Relay 61 also actuates NC contacts 61d to remove relay 58 from the increase demand line after stage 1 is energized.

Before proceeding to a description of stage 2, it will be helpful to appreciate the function of each of the relays in stage 1 because the same or similar functions are performed in succeeding stages. The function of relay 58 is to lock the stage 1 energizing circuitry in an energized state (by coupling it directly to the power line 30 through the contacts 58a) and to remove the energized circuitry (by actuating the NC contacts 61d) from the increase demand signal line 19. The reason for this, as has previously been mentioned, is that unless an increase signal pulse is present, the increase signal demand line 19 is at a floating potential. Hence, when switches 56a, 56b and 56c are in the automatic setting, the first increase signal demand pulse present on the line 19 energizes the relay 58 and subsequent increase demand pulses will not be fed to this relay.

Another function of the relay 58 is to energize the unloaders for all the succeeding stages of this controller section. This signal is fed through the switch 56c via a line 64 directly through NC contacts associated with Delay On relays of succeeding stages of their unloaders, as described presently.

The function of the Delay On relay 61 is to establish continuity in the increase demand signal line 19 (by actuating NO contacts 61a) so that a subsequent increase demand signal pulse will be transmitted to the succeeding controller stage (or from the last stage of one section to the first stage of the succeeding section). However, this continuity is established only after the first increase demand signal pulse has terminated so that it will not energize subsequent stages. Therefore, the timing delay set in Delay On relay 61 preferably is such that its associated contacts are energized only after the increase demand pulse has terminated. In a preferred arrangement, since the increase demand pulse lasts for 4.5 seconds, the timing delay of the Delay On relay 61 is set at ten seconds. The Delay On relay 61 also opens contacts 61d, and energizes the starter for the motor through contacts 61b—it will be remembered that the first stage of the motor is always loaded. At the same time, it energizes the indicator lamp 62 and the elapsed time meter 62a.

The Delay On relay 61 also energizes a line 63 which is connected to the junction between the contacts 61b and the starter, and is fed to stage 2. The line 63 is the line along which power is fed to stage 2. The line 63 is the line along which power is supplied to stage 2, whereas stage 1 has received power directly through the switch 56b.

The function of the relay 59 is to de-energize stage 1 (by actuating NC contact 59a) when a decrease demand pulse is received along the decrease demand signal line 20. When the contacts 59a open, of course, the relay 58 becomes de-energized thereby opening contact 58a; and the relay 61 will also be de-energized thereby immediately opening contacts 61a and 61b while closing contacts 61d. It will be observed that the combination of relays 58 and 61 together with their associated contacts establishes a gating or routing mechanism for routing the first increase demand pulse to circuitry for energizing stage 1 and for routing subsequent increase demand pulses to succeeding stages. A similar gating mechanism is provided for routing the decrease demand pulse. However, since this discussion concerns the first stage of the first compressor, there is no need to route subsequent decrease demand pulses.

In addition to the provision for bypassing individual controller stages or an entire controller section (which will be described later), the present system permits an operator to adjust the system for any number of stages by a simple switch setting. This permits system operation wherein increase demand pulses will be routed directly to the next de-energized stage without delay. Similarly, decrease demand pulses will be routed directly to the proper energized stage wtihout delay. This feature is considered an important advantage of the present invention since prior systems required a relay for every stage which the controller was originally designed to accommodate. For example, in some prior systems that were designed to accommodate a controller section with four stages and there were in fact only two operable stages, there would be an additional delay of two periods between energizing the last stage of a preceding controller section and the first stage of a succeeding section.

In the illustrated system, the desirable result is accomplished by means of a switch having three wafers or decks, with each deck having four fixed terminals since the illustrated system is designed to accommodate four stages. The switch is generally designated 57 in FIGS. 3 and 4; and this numeral refers to the dashed line which schematically represents the mechanical shaft or lever common to all three of the switch decks which are denoted 57a (see stage 2), 57b (stage 3), and 57c (stage 4, FIG. 4) respectively.

The "H" terminal of the previously described switch 56a is directly connected to the No. 1 terminal of each of the switches 57a, 57b and 57c. The No. 2, 3 and 4 positions of switch 57a are connected together; the No. 3 and 4 positions of switch 57b are connected together; and the No. 1 and 2 positions of this switch are also connected together but isolated from the former. The No. 1, 2 and 3 positions of switch 57c are connected together.

Turning now to stage 2 in FIG. 3, a relay 65 having NO contact 65a is connected in series with NC contacts 70d between the No. 4 position of switch 57a and the common line 31. The contacts 61a are coupled to the movable blade or arm of switch 57a to route the increase demand signal line through it. The relay 65 is similar in structure and operation to the previously-described relay 58 of stage 1. Stage 2, however, has in addition a Delay Off relay 66 having NO contacts 66a and NC contacts 66b. A relay 67, similar to the previously-described relay 59, is connected in series with the NO contacts 66a to the decrease demand signal line; and the NC contacts 66b are interposed in the decrease demand signal line 20 between the relay 59 of stage 1 and the connection of the line 20 to the NO contacts 66a. The coil of the Delay Off relay 66 is connected to the common junction of the relay 65 and its associated contacts.

NC contacts 67a (actuated by the relay 67), are connected between the line 63 feeding power from stage 1 and the NO contacts 65a. A switch, generally designated 69 and similar to the previously-described switch 56c has its fixed terminal "A" connected to the common junction of the contacts 65a and 70d, and its fixed contact "H" connected directly to the line 63. The switch 69, when set to position "H," will bypass stage 2 insofar as the increase and decrease demand signal pulses are concerned. A Delay On relay 70 has a first set of NO contacts 70a interposed in the increase demand line 19, a second set of NO contacts 70b having one contact coupled to the line 64 from stage 1, a set of NC contacts 70c coupling the line 64 to the stage 2 unloader, and the previously-described NC contacts 70d. The other terminal of the NO contacts 70b is connected to a signal lamp 72, an elapsed time meter 73, and a line 74 along which power is subsequently supplied to stage 3. Thus, when switch 69 is set to the "H" position, relay 70 will be energized as soon as contacts 61b of the previous stage are energized, which is less than the period between increased demand pulses.

As with stage 1, the continuity of the increase demand signal line is established by connecting one of the contact 70a to the wiper blade of switch 57d.

In operation, in the automatic mode, the energizing circuitry for stage 2 operates similarly to the previously-described energizing circuitry for stage 1 except that the stage 2 circuitry is locked in by receiving power along the line 63 rather than directly from the power line 30 as in stage 1. An additional function is performed by the Delay Off relay 66 since when the stage 2 circuitry is energized, so is the Delay Off relay 66; and it disconnects the previously stage from the decrease demand signal line by opening contacts 66b and at the same time couples the decrease demand signal line directly to the releasing relay 67. Thus, the Delay Off relay 66 provides a gating or routing mechanism which, when the instant stage has been energized, will route the first-received decrease demand pulse to de-energize that stage.

This first-received decrease demand pulse also de-energizes the Delay Off relay 66 by opening the contacts 67a. After a ten-second interval (since the decrease demand pulses are also 4.5 seconds) the contacts 66a open thereby removing this stage from the decrease demand signal line; and the contacts 66b are closed, thereby routing a subsequent decrease demand signal pulse to the preceding stage.

Stages of the controller section for compressor "A" subsequent to stage 2 are similar to the circuitry shown in stage 2, except, as will presently be explained in more detail, the last stage of each section does not propagate the power (along lines 63 and 74) to a subsequent stage since, as already mentioned, each of the first stages of the compressors is energized directly from the power line 30. Further, the line 64 which energized the unloaders of stages 2, 3 and 4 terminates at the last stage.

Referring now to FIG. 4, the interface between the last stage of one controller section and the first stage of the succeeding section are shown in detail. In FIG. 4, stage 4A is the last stage of the controller section for compressor "A"; and it is separated from the first stage of the succeeding controller section by means of a vertical dashed line 79. As already mentioned, almost all of the elements in stage 4A are identical in structure, operation and result to those which have already been explained in connection with stage 2 of the same section; and the elements repeated in stage 4A are identified with corresponding reference characters preceded by a "T"; thus the counterpart of the relay 65 of stage 2 is denoted 265 in stage 4A.

One difference is that the line 64 is received directly from the first stage of this controller section. A second difference is that when the Delay On relay 270 is energized, thereby closing the NO contacts 270b, power is supplied to the elapsed time meter 273 and the signal lamp 272; however, it is *not* fed to subsequent stages as had been done in the case of the line 74 of stage 2. The increase demand signal line is fed through the wiper blade of switch 57c before being connected to contacts 270a. The NO contacts 270a associated with the Delay On relay 270 establishes continuity in the increase demand signal line 19 as before, so that after stage 4 is energized, subsequent increase demand pulses are gated to stage 1 of the controller section for compressor "B."

In order to distinguish between like stages of different sections, the individual stages will sometimes hereafter be referred to by a numeral representing the stage followed by a letter identifying the compressor controller section. Since stage 1B is similar to the previously-described stage 1A, the elements shown therein are identified with corresponding reference numerals by a "2." The structure and operation of repeated elements are the same.

In addition to the three relays shown in stage 1A, stage 1B has a Delay Off relay, identified by reference numeral 283, having its coil connected between the "A" contact of the switch 256c and the common line. A set of NO contacts 283a is interposed between the decrease demand signal line 20 and the relay 259; and a set of NC contacts 283b is inserted in the decrease demand signal line 20 for establishing continuity to the preceding stage 4A, as previously described.

In operation in the automatic mode, stage 1B, since it is a first stage of a controller section, receives its power directly from the power line 30 through the switch 256b. Switches 256a, 256b and 256c are commonly controlled, but the dashed line is not shown for clarity of illustration. Stage 1B is energized by an increase demand pulse received from the previous stage 4A after the previous stage has been energized. Further, the Delay Off relay 283, is energized by an increase demand pulse (through contacts 261d and held in an energized condition by contacts 258a); and it is deenergized by a received decrease demand pulse through actuated contacts 283a and relay 259. When de-energized, the contacts 283a are opened and contacts 283b are closed thereby gating subsequent decrease demand pulses to the preceding stage 4A.

It will be noted that when the stage 1B is energized, as is similar with the operation of stage 1A, a line 264 is fed to all succeeding stages of that section to energize their associated unloaders, and a line 263 feeds power to stage 2B so that succeeding stages may be cascaded with succeeding increase demand pulses.

Turning now to FIG. 5, there is shown a circuit schematic diagram of the final two stages, 3E and 4E, of the last controller section (which is the section 11 of FIG. 1). This figure shows the interfaces between two adjacent stages; and it also shows the terminal connections for the last stage of the last controller section. Again, many of the circuit elements are similar to those of previous stages and in order to simplify the description, the elements of section 3E have reference symbols identical to those for corresponding elements of stage 2 of FIG. 3 except that they are preceded by a "4"; similarly, the elements of section 4E of FIG. 5 have reference symbols similar to those of stage 2 of FIG. 3 except that they are preceded by a "5." It will be observed that the line 464 (which carries a signal to all unloaders for that section as soon as the first stage of the last controller section is energized) is coupled directly through the NC contacts 470c and 570c to the unloaders associated with the sections 3E and 4E.

With respect to section 4E, which is the last of the cascaded stages, the increase demand signal line 19 terminates at the NC contacts 570d associated with the relay 570 (although it may, of course, be continued to accommodate more sections or stages). There are no normally-open contacts associated with the Delay On relay 570 for establishing continuity between input and output of the increase demand signal line for that stage. When the last stage 4E is energized and locked in to the last section of the propagating power line 474 so that the first decrease demand pulse from the controller timing section 18 will be gated directly through the closed contact 566a to energize the relay 567. The contacts 567a are opened and the stage 4E is de-energized. After the Delay Off relay 566 has timed out for the required ten-second interval, the contacts 566a are opened and the contacts 566b are closed thereby gating subsequent decrease demand pulses to section 3E. If the next pulse is an *increase* demand signal pulse, the relay 565, of course, will be energized through the now-closed contacts 570d of the relay 570.

The previously-mentioned feature of the instant system which permits accommodation of any number of stages for a compressor controller section will now be explained. The switch 57 (with its three decks 57a, 57b and 57c) is the stage selector switch. In the illustrated embodiment there are four stages and the stage selector switch 57 is set to position No. 4. However, if the fourth stage were removed and the stage selector switch set to position No. 3, operation of stages 2 and 3 would be unaffected, but the increase demand signal link from stage 3 would be coupled through the No. 3 position of switch 57c directly to the wiper arm of switch 256a of stage 1B thus bypassing the contacts 270a without delay. Similarly, if the stage selector switch is set to position No. 2 (indicating only two stages), then the increase demand signal line of stage 2 would be coupled directly to the wiper arm of switch 256a thereby bypassing stages 3A and 4A.

Any of the individual stages or a complete controller section for a given compressor may be removed from automatic operation and operated on a manual basis by moving its associated switch to the "H" position. For example, if the switch 469 of section 3E (FIG. 5) is set to "H" and the previous section 2E had already been energized, then line 463 is energized. Thus, without having received a subsequent increase demand pulse, the Delay On relay 470 is energized directly through the switch 469; and the unloader of section 3E is removed when the contacts 470c are opened. After the Delay On relay 470 times out, the contacts 470a will close, and the next increase demand pulse will be fed directly to succeeding section 4E.

If an individual stage is placed on manual operation, power immediately reaches the Delay On relay of that stage without having to energize the holding or locking relay. The Delay Off relay also is not energized and a decrease demand pulse will bypass that controller stage. It will also be noted that when the first stage of any compressor is placed on manual operation, subsequent stages of that controller section are not energized unless they, too, are placed on hand or have been energized by an increase demand pulse. If all stages are on manual operation, subsequent stages come on in ten-second intervals determined by their respective Delay On relays. Subsequent stages of the compressor can thus be held off if desired.

When a compressor is placed on manual operation, the increase demand pulse is fed around that compressor and energizes the next subsequent compressor which is on automatic setting. Similarly, the decrease demand pulse bypasses any compressor stage on manual operation and energizes the preceding compressor stage which is set on automatic without additional time delay.

In the exposition heretofore set forth, references to switch contact sets 56a, 56b and 56c (and their counterparts in the first stage of each section), have been solely on the basis of two positions, namely, "A" for automatic mode, and "H" for manual. However, each such switch contact set may comprise three positions; namely, the "A" and "H" positions, and a third position "O" for "off."

For switch contact sets 56b and 56c (and their counterparts in the first stage of each section), the "O" position is not connected. However, for switch contact set 56a (and its counterpart in the first stage of each section), position "O" and "H" are coupled. This serves, when a compressor is to be kept in fully nonoperating condition, to provide a path for the increase impulse to reach the next succeeding compressor stage set in automatic mode.

Now that the detailed circuits of the individual stages and their interconnections have been explained, certain operating features of the present system will be apparent to persons skilled in this art. One feature is that momentary fluctuations in suction pressure will not affect the controller. Rather, the suction pressure much deviate from the control range for the full timer setting in order to add or release a compressor stage. The timers in the timing section 18 reset to zero without generating an output pulse if they are de-energized prior to generating a pulse. Further, in a start-up operation, when the controller timing section is first energized, the increase demand impulses are generated at one-minute intervals. After the suction pressure is within control range and the increase demand pulse train terminates, it is likely that the suction pressure will fall below control range so that the timer 47 of timing section 18 will be energized to generate its train of decrease demand pulses. This will also energize the relay 49 which will switch the period between subsequent *increase* demand pulses to a five-minute interval. From then on, both trains of demand pulses are on a five-minute period.

With the described circuitry in the stages, the energizing and releasing of individual stages in the automatic mode is carried out in predetermined order, so that the last-energized stage is the first to be de-energized if a decrease demand pulse is received. Conversely, the last de-energized stage is the first to be re-energized if an increase demand pulse is generated. Wear on the compressors can be evened out by interchanging the order of energizing the various compressor stages. Further, the timing of the individual relays in each stage can be changed, if desired.

Persons skilled in the art will appreciate that the present invention is not limited to the specific circuit elements which have been described, there being many known elements, both electro-mechanical and electronic such as solid state switches, which can readily perform the individual functions described. It is, therefore, intended that all such equivalents and modifications be covered as they are embraced within the spirit and scope of the appended claims.

I claim:

1. Apparatus for varying a parameter of a physical system such that said parameter will tend to assume a value within a predetermined control range comprising means sensing said system for generating a first electrical signal when said parameter varies in one direction of said range and a second electrical signal when said parameter varies in the other direction of said range, a plurality of cascaded electrical controller stages including a first and a last stage, each of said stages adapted to transmit a control signal to said system for varying said parameter in a predetermined manner when energized, each of said stages prior to said last stage including first delay gating means actuated by said first signal for gating subsequent ones of said first signal to the succeeding stage, each stage subsequent to said first stage further including second delay gating means actuated by said second signal for gating subsequent ones of said second signal to the preceding stage, and means coupling said first signal to said first stage and said second signal to said last stage, whereby said cascaded stages are energized in predetermined sequence and interval in response to said first signal and said stages are de-energized in reverse sequence in response to said second signal to bring said parameter within said control range.

2. A system according to claim 1 wherein said physical system is a refrigeration system including a refrigerant with a plurality of compressor stages compressing said refrigerant and said parameter is the suction pressure of said system, said sensing means including first timing means for generating an increase demand pulse comprising said first signal after said suction pressure has exceeded said control range a predetermined time, said first timing means continuing to periodically generate increase demand pulses for energizing successive compressor stages in sequence until said suction pressure is within said control range, said sensing means further including second timing means for generating a decrease demand pulse comprising said second signal after said suction pressure has fallen below said control range a predetermined time, said second timing means continuing to periodically generate decrease demand pulses for de-energizing compressor stages in reverse sequence until said suction pressure is within said control range, whereby said control apparatus is insensitive to transient excursions of said suction pressure outside of said control range and said compressor stages are energized and de-energized in a predetermined order and at fixed intervals.

3. A system according to claim 2 wherein said means further comprising startup timing means energized only upon startup to generate increase demand pulses at a shorter interval than the interval of said first timing means when said suction pressure has exceeded said control range for a predetermined time and continuing to generate the same until said suction pressure is within said control range, and switching means energized by said second timing means for coupling the output signal of said startup timing means to said first stage before said second timing means is actuated and for coupling the output signal of said first timing means to said cascaded stages after said second timing means has been first energized, whereby the interval of said increase demand pulses is shorter during start-up and longer after the first of said decrease demand pulses has been generated.

4. A system according to claim 2 further comprising alarm means including means sensing said suction pressure for signaling an alarm in response to said suction pressure exceeding a predetermined level above said control range, and shut off means coupling electrical power to said sensing means for shutting off said power in response to said suction pressure falling below a predetermined level below said control range.

5. A system according to claim 2 wherein each of said controller stages subsequent to the first further comprises a discontinuous increase demand signal line coupled to a preceding and a succeeding stage, circuit holding means for holding its associated stage energized in response to said first signal, and first switching means actuated by said first delay gating means for establishing continuity in said increase demand signal line after the increase demand signal pulse energizing said stage terminates.

6. The system of claim 5 wherein each of said stages prior to the last comprises a discontinuous decrease demand signal line coupled to a succeeding and a preceding stage, and second switching means actuated by said second delay gating means for establishing continuity in said decrease demand signal line after the decrease demand pulse de-energizing said stage terminates.

7. A system according to claim 6 wherein the circuit holding means of each stage holds the first and second delay gating means of that stage energized, each stage further comprising hand-operated switch means for selectively energizing said circuit holding means whereby said stage may be bypassed by said increase demand signal pulses and said decrease demand signal pulses.

8. The system of claim 1 further comprising manual switch means for selectively setting each of said stages to an automatic mode wherein a succeeding stage is energized only after an increase demand pulse has energized said stage and elapsed and a preceding stage is de-energized only after adecrease demand pulse has de-energized sai stage and elapsed, and to a manual mode wherein said sage is bypassed by both increase demand impulses and decrease demand pulses.

9. The system of claim 1 where the system being controlled is a refrigeration system and the control parameter is suction pressure of a plurality of cascaded compressors each having a plurality of stages and wherein each controller stage is adapted to sequentially energize an associated compressor stage in response to a received increase demand signal pulse and to sequentially de-energize said associated compressor stage in response to a received decrease demand signal pulse.

10. The system of claim 9 wherein each of said first delay gating means comprises an input signal line for receiving an increase demand signal from a preceding stage, an output line for feeding an increase demand signal to a subsequent stage, an input power lead, switching means responsive to a first received increase demand signal for coupling said input power lead to lock said stage in an energized state, delay on switching means responsively to said first received increase demand signal pulse for coupling said input signal line to said output signal line only after said first received increase demand pulse terminates and for generating a signal to an associated compressor stage to energize the same, said delay on switching means further coupling said input power lead to a subsequent stage after said first received increase demand pulse terminates, and means responsive to said first received increase demand signal pulse for disconnecting said stage from said increase demand signal line.

11. The system of claim 10 wherein each of said second delay gating means comprises a first signal line for receiving a decrease demand pulse signal from a succeeding stage, a second signal line for feeding a decrease demand signal line to a preceding stage, release switching means responsive to a first received decrease demand pulse signal for de-energizing said locking switching means thereby disconnecting said input signal line and said output signal line and returning said locking switching means to said input signal line, and delay off switching means responsive to a first received decrease demand pulse signal for coupling said first signal line to said second signal line only after said decrease demand signal pulse terminates thereby to route subsequent decrease demand signal pulses to preceding stages.

12. A controller stage adapted to be cascaded with like stages by a train of increase demand and decrease demand signal for sequentially energizing and de-energizing associated stages of a multi-stage compressor system comprising: an increase demand signal line; a decrease demand signal line; first delay gating means including a first switching means normally interrupting said increase demand signal line for establishing and maintaining continuity in said increase demand signal line a predetermined time after and in response to the first-received of said increase demand signal pulses; second delay gating means including a second switching means normally establishing continuity in said decrease demand signal line for interrupting the same in response to the first-received of said increase demand signal pulses; and releasing means connected to said decrease demand signal line only when said second delay gating means is energized for de-energizing said first and second delay gating means in response to the first-received of said decrease demand pulses, said second switching means being actuated by said second delay gating means a predetermined time after said decrease demand pulse terminates to establish continuity in said decrease demand signal line.

13. The stage of claim 12 further including a source of electrical power; holding means energized by a first-received increase demand signal for coupling said first and second delay gating means to said source, said releasing means de-energizing said holding means when said first decrease demand signal is received; and switching means actuated by said first delay gating means for transmitting a control signal to its associated compressor stage.

14. In a control system for maintaining a system parameter within a desired range by energizing and de-energizing cascaded individual controller stages in predetermined sequence, a timing pulse generator comprising first timer means including a periodic pulse generator for generating a train of increase demand pulses on an increase demand signal line of a first predetermined period during startup when said parameter differs from said range in a first direction, second timer means including a periodic pulse generator for generating a train of increase demand pulses on said increase demand signal line of a second period longer than said first period when said parameter differs from said range in said first direction, third timer means including a periodic pulse generator for generating a train of decrease demand pulses when said parameter differs from said range in said second direction, and switching means responsive to the energization of said third timer means for thereafter disconnecting said first timer means from said increase demand signal line and for coupling said second timer means to said increase demand signal line, whereby said stages may be cascaded on at shorter intervals only during startup and thereafter be cascaded on at longer intervals.

15. In a method for controlling the sequencing of stages of a compressor system the steps comprising: generating an electrical signal in response to a parameter of said system varying in one direction from a desired control range; coupling said signal along a demand signal line to a controller stage associated with the next compressor stage to be energized; then establishing electrical continuity through said stage and transmitting a signal to said compressor stage next-to-be-energized.

16. In the method of claim 14, the further step of breaking continuity in a decrease demand signal line at said controller stage when said stage is energized by an increase demand signal; and routing the next decrease demand signal to the last-energized of said stages for de-energizing the same and then establishing the continuity in said decrease demand signal line.

References Cited

UNITED STATES PATENTS

| | | | |
|---|---|---|---|
| 2,157,329 | 5/1939 | Fillo | 62—157 |
| 2,168,157 | 8/1939 | Crago | 62—158 |
| 2,177,602 | 10/1939 | Spaan | 62—158 |
| 2,364,459 | 12/1944 | McGrath | 62—175 |
| 2,714,806 | 8/1955 | Sculben | 62—175 |

WILLIAM J. WYE, Primary Examiner

U.S. Cl. X.R.

62—157, 162, 175, 231, 335